United States Patent
Kojima et al.

[19]

[11] Patent Number: 6,059,174
[45] Date of Patent: May 9, 2000

[54] FLUX COMPOSITION FOR BRAZING OF ALUMINUM MATERIAL AND METHOD FOR BRAZING OF ALUMINUM MATERIAL

[75] Inventors: Masahiro Kojima; Futoshi Watanabe, both of Oyama; Atsuhiko Tounaka, Yokohama; Kiyotada Yasuhara, Kashiwa; Hiroyuki Nojiri, Ota-Ku; Katsuyoshi Yamasoe, Sakura, all of Japan

[73] Assignees: Showa Aluminum Corporation; Nippon Paint Co., Ltd., both of Osaka, Japan

[21] Appl. No.: 09/202,922

[22] PCT Filed: Apr. 24, 1998

[86] PCT No.: PCT/JP98/01919

§ 371 Date: Feb. 8, 1999

§ 102(e) Date: Feb. 8, 1999

[87] PCT Pub. No.: WO98/50197

PCT Pub. Date: Nov. 12, 1998

[30] Foreign Application Priority Data

May 6, 1997 [JP] Japan ................................. 9-115378
Jun. 13, 1997 [JP] Japan ................................. 9-156484

[51] Int. Cl.[7] .......................... B23K 31/02; B23K 35/363
[52] U.S. Cl. ........................ 228/183; 228/223; 148/25; 148/26
[58] Field of Search .................... 228/183, 207, 228/223, 232; 148/23, 25, 26

[56] References Cited

U.S. PATENT DOCUMENTS 5,173,126  12/1992  Ogura et al. .............................. 148/23
5,360,158  11/1994  Conn et al. .

FOREIGN PATENT DOCUMENTS

| 196 36 897 A1 | 3/1998 | Germany . | |
| 62-224496 | 10/1987 | Japan | 228/223 |
| 7-155987 | 6/1995 | Japan . | |
| 08187594 | 7/1996 | Japan | 228/224 |
| 9-29487 | 2/1997 | Japan . | |
| 9-174277 | 7/1997 | Japan . | |

Primary Examiner—Samuel M. Heinrich
Attorney, Agent, or Firm—Oliff & Berridge, PLC

[57] ABSTRACT

A flux composition for brazing of an aluminum material which can feed a proper amount of flux to an area to be joined at the time of brazing and at the same time can improve working environment, and a method for brazing of an aluminum material. The method comprises: coating an aluminum material to be joined with a flux composition comprising 0.5 to 25 parts by weight of a polymeric compound having a number average molecular weight of 50000 to 5000000 and comprising repeating alkylene oxide units, 5 to 30 parts by weight of a fluoride flux, and water added in such an amount as will provide a total amount of the composition of 100 parts by weight; heating the coated area to remove water; heating the coated area to decompose and remove the polymeric compound; and then conducting heating for brazing.

20 Claims, 2 Drawing Sheets

FLUX COMPOSITION FOR BRAZING OF ALUMINUM MATERIAL AND METHOD FOR BRAZING OF ALUMINUM MATERIAL

TECHNICAL FIELD

This invention relates to a flux composition for brazing of aluminum materials such as in the production of heat exchangers, to a flux composition which is used when brazing parts comprising aluminum or an aluminum alloy, to a method of brazing aluminum materials, and in particular to a method of joining plural parts together by brazing in a single brazing step.

In this specification, the term "aluminum" is used to mean various aluminum alloys in addition to pure aluminum.

BACKGROUND ART

Generally, when many hundreds of points have to be joined by brazing as in the case of a heat exchanger, brazing sheets are used for component pieces such as plates or fins, the assembly being heated in a furnace after fitting all parts together and the brazing of plural points being accomplished in one heating step.

An example of the use of brazing sheets to assemble aluminum materials is in the construction of a heat exchanger body, where it was common to employ preplaced brazing using a preplaced brazing piece such as a pipe or the like. Alternatively, instead of a pipe, a powdered brazing paste was used as an auxiliary material in the brazing of the heat exchanger body. In both cases, the aluminum material to be brazed was an aluminum-silicon alloy.

In one method of brazing aluminum parts, the aluminum oxide film on the surfaces of the parts to be joined was removed by a flux. In recent years, instead of the chlorine type flux material which was previously used, a non-corrosive, non-water-soluble aluminum fluoride type flux has been developed. This fluoride type flux is used as a flux for the above furnace brazing step. As it is almost non-corrosive, non-water-soluble and non-hygroscopic when compared with the previous chlorine type flux, the fluoride type flux was dispersed in a liquid together with an aluminum alloy brazing powder immediately prior to use. This flux suspension was then coated onto the parts to be joined by spraying or dipping, and after drying the parts, they were assembled.

According to the prior art, the medium used to disperse this flux was generally water, however as the viscosity of water is extremely low, the adhesion of the flux to the parts to be joined was poor. If adhesion is poor, the flux easily falls off after coating when the coated surfaces are subject to friction and vibration. This adversely affects the working environment due to scatter of flux and decline of brazing properties, and leads to the build-up of foreign matter in the interior circuitry of the heat exchanger. Also, as a large amount of flux drips off during the coating process, excess flux had to be applied to cover the loss. This improves brazing properties, but leads to increase of flux residues on the joining surfaces after brazing by heating and again results in poorer film adhesion during the coating process. If these large amounts of residues retain moisture, anti-corrosion properties are impaired and an unusual odor is produced. Moreover, residues in the internal circuitry of the heat exchanger increased resistance to the flow of air or coolant and caused heat exchanging performance to fall.

Various flux compositions were therefore proposed to increase the viscosity of the flux suspension and improve its adhesion. In one such technique, the dispersant is an organic solvent, and a resin (e.g. carboxymethylcellulose, rosin, vinyl acetate) is added to increase the viscosity of the vehicle ("vehicle" being a general term for the dispersant of the flux or aluminum alloy powder, i.e. the resin and organic solvent). For example, JP 07-185796A suggests polyvinyl alcohol as an example of such a resin.

However, there was a problem with this flux composition in that when the temperature was increased up to the brazing temperature (approx. 600° C.), the external appearance of the product was marred and defects in joins were caused by pyrolysis gases, voids in fillets due to carbonization and black surface residues. Also pyrolysis products also adhered to the aluminum brazing furnace.

Another technique is disclosed for example in JP 08-187594A, wherein a viscous vehicle, comprising a polyalkylene oxide resin dissolved in an organic solvent, is used as a dispersant. Suitable viscosity is obtained by dissolving the aforesaid polyalkylene oxide in the solvent, pyrolysis properties are satisfactory, and carbonization residues are not produced after brazing. This flux paste is applied to the parts to be joined, and after heating to vaporize or decompose the components of the vehicle, brazing is performed by the usual method.

However the organic solvent had an unusual odor, and the foul odor produced on heating gave workers an unpleasant feeling. Some organic solvents used in the flux paste such as 1,4-dioxane had a high flammability, were toxic to man, and affected workers' hygiene as a whole.

Moreover solvent remained in joins as undecomposed residue, causing deterioration of brazing properties.

When a viscous vehicle was used as dispersant, adhesion of flux was improved compared to the case when water was used, but some flux fell off from joins due to friction or vibration during work performed after coating and drying up to the brazing step. Hence, the problems due to peeling flux were still not completely resolved.

DISCLOSURE OF THE INVENTION

Figure 1:
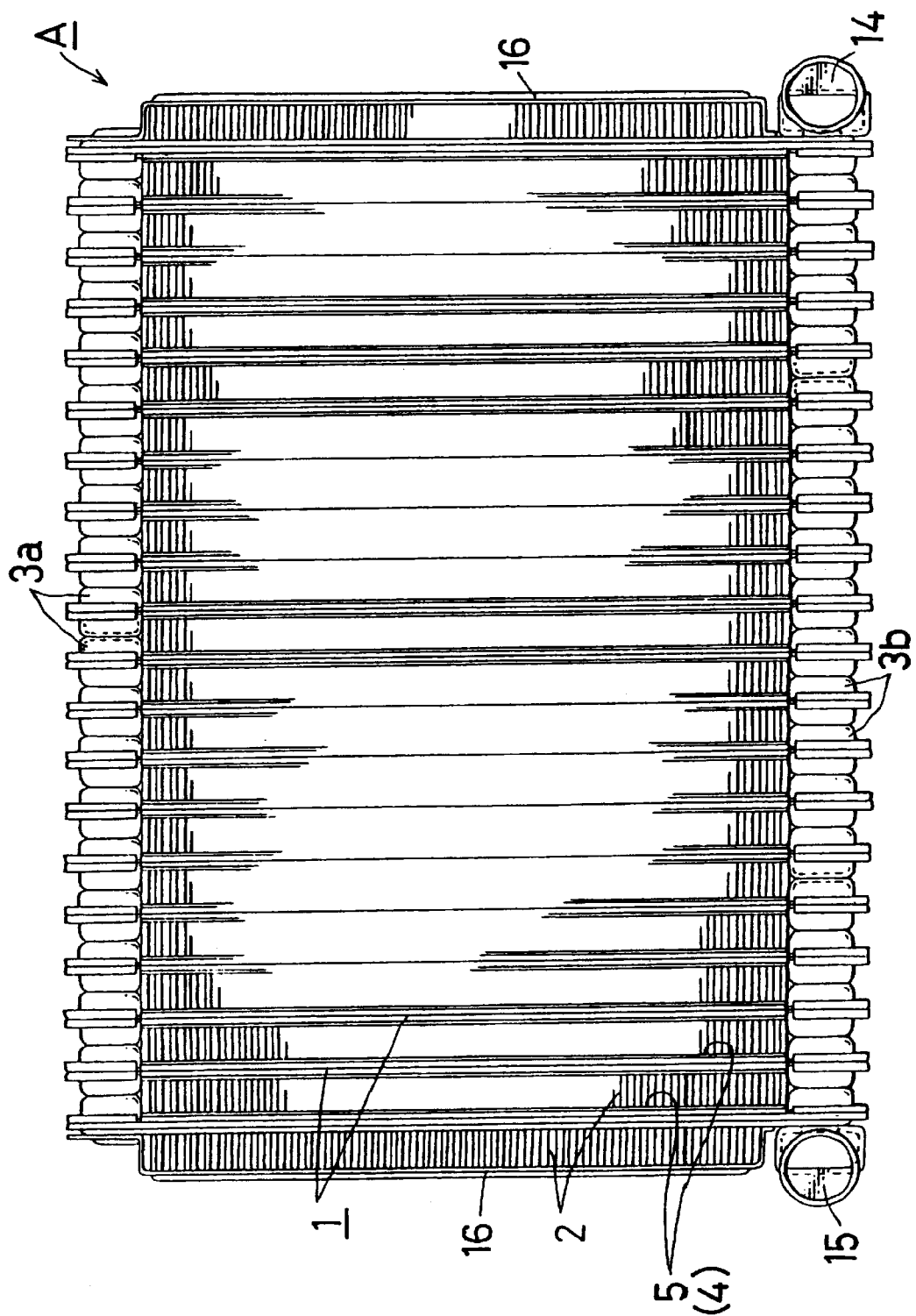
FIG. 1 is a front elevation view of a heat exchanger used as a test body for a brazing test according to one embodiment.

This invention, which was conceived in view of the above problems, aims to provide a flux composition and method employing this composition for the brazing of aluminum materials wherein a flux amount supplied for the brazing of joins is exactly the right amount, and wherein the working environment is improved.

In order to achieve the aforementioned objectives, the flux composition for brazing aluminum materials according to this invention comprises 0.5–25 weight parts of a polymer compound having alkylene oxide repeating units of number average molecular weight 500,000–5,000,000 and 5–30 weight parts of a fluoride type flux, the remainder being water to make the composition up to 100 weight parts.

Water is used as a dispersant for the flux, and as the resin used decomposes and volatilizes at 140° C.–200° C., the resin component can be completely removed by performing a simple preheating before the brazing step, only the flux useful for brazing being supplied to the aluminum materials. There is therefore no risk that the furnace will be polluted by or that brazing defects will be caused by decomposition residues of resin components.

The flux composition for brazing of aluminum materials according to this invention may also comprise 0.03–5 weight parts of a non-ionic surfactant.

The non-ionic surfactant has a high affinity with the flux, so the flux can be stably dispersed in the composition. The stability of the composition over time is therefore improved.

To achieve the aforesaid objects, the method of brazing aluminum materials according to this invention is characterized in that the flux composition of the invention is coated onto aluminum materials to be joined, the coated surfaces are heated to remove water, the coated surfaces are heated to decompose the polymer compound, and heating is then performed to accomplish the brazing.

There is no particular limitation on the type of aluminum materials which can be brazed by the method of this invention provided that the fluoride type flux of the invention can be applied. Moreover, there is no limitation on the brazing materials used provided that they allow use of the fluoride type flux of the invention.

In the flux composition according to this invention, water is used as a dispersant, a water-soluble polymer is used as a binder to confer viscosity, and adhesion of the flux to joins is thereby improved.

Flux composition
Polymer compound

The polymer compound is a substance having repeating units of an alkylene oxide such as ethylene oxide or propylene oxide. It may be a homopolymer of alkylene oxide, or a copolymer with a different type of alkylene oxide or other compound. Either straight-chain or branched polymer compounds can be used. Preferred examples of the polymer compound are polyalkylene oxides obtained by addition polymerization of a low alkylene oxide such as ethylene oxide with an organic compound having two or more active hydroxyl groups, or a polymer compound obtained by reaction of such a compound with a polybasic carboxylic acid, its anhydride or low alkyl ester, or a diisocyanate. The terminal groups of the molecule may comprise alkoxy, carboxyl or ester in addition to hydroxyl, and there may be ester bonds or urethane bonds in the molecule in addition to ether bonds.

The number average molecular weight of this polymer compound is preferably 50,000–5,000,000 but more preferably 50,000–1,000,000. When the number average molecular weight is less than 50,000, sufficient viscosity is not obtained unless a large amount of the polymer compound is used, which is uneconomical.

And as pyrolyzing properties are poor (the pyrolysis starting temperature is the same as for polymer compounds having a molecular weight of 50,000–5,000,000, but time is needed for complete decomposition), pyrolysis residues easily form after brazing.

On the other hand when the number average molecular weight exceeds 5,000,000, thread-forming properties are too strong and viscoelasticity is poorer.

Thermal decomposition properties are better for unlike alkylene oxide blocks or random copolymers than for homopolymers of similar alkylene oxides, which is advantageous for preventing blackening due to pyrolysis residues after brazing. Also, ethylene oxide-propylene oxide (EO-PO) random copolymers are to be preferred as they have better thermal decomposition properties than ethylene oxide (EO) homopolymers.

The flux composition of this invention preferably contains 0.5–25 weight parts, and more preferably 1–10 weight parts of polymer compound. When the amount of polymer compound is less than 0.5 weight parts, as sufficient viscosity cannot be obtained, the adhesion amount of flux drops, and brazing defects arise. On the other hand when the amount of polymer exceeds 25 weight parts, the viscosity becomes excessive, the adhesion amount of resin increases, and pyrolysis residues are produced when brazing is performed. Moreover, an excessive amount of flux adheres which is uneconomical.

The amount of polymer compound may be determined by indication of the viscosity of the flux composition. A suitable viscosity of the flux composition is 150–500 cps at 23° C. The amount of polymer compound may be set according to its number average molecular weight so that the viscosity lies within this range.

Dispersant

In this invention, water is used as dispersant. Water is odorless. As an organic solvent is not used, there is no risk of ignition or explosion due to solvent volatility, procedures are safe to carry out, and since toxic solvents are not spilt during operations, hygiene in the workplace is improved.

Fluoride type flux

According to this invention, it is desirable that a fluoride-type flux is used. The fluoride type flux may be an aluminum potassium fluoride flux such as $AlF_3$-$KF$, $KAlF_4$-$K_3AlF_6$, $K_3AlF_6$, $KAlF_4$ and $KF$-$AlF_3$-$Al_2O_3$, or $Cs_xAl_yF_z$.

The flux composition of this invention contains 5–30 weight parts but more preferably 5–20 weight parts of fluoride type flux. When the amount is less than 5 weight parts, the flux coating amount is small which may lead to brazing defects. On the other hand when the amount exceeds 30 weight parts, the flux allows the brazing material to spread and flow well, but the appearance of the product is impaired by large amounts of white residue or black spots on the surface of the fillet. For a fluoride type flux, a suitable lower limit is 5 weight parts.

Surfactant

It is desirable to add a surfactant to the flux composition of this invention in order to increase the dispersing properties of the flux. This surfactant may be a non-ionic type surface active agent such as polyoxyethylene glycol, polyoxypropylene glycol, polyoxyethylene polyoxypropyleneglycol, polyoxyethylene alkylphenyl ether, polyoxyethylenealkyl ether, glycerin fatty acid ester, sorbitan fatty acid ester, pentaerythritol fatty acid ester, polyoxyglycerin fatty acid ester, polyoxyethylenesorbitan fatty acid ester, polyoxypentaerythrytol fatty acid ester, polyoxyethylene alkylaminoether, or the polyoxyethylene polyoxypropylene glycol of ethylene diamine, due to the affinity of these compounds with the fluoride type flux.

The flux composition of this invention preferably contains 0.03–5 weight parts but more preferably 0.04–1 weight parts of the non-ionic surfactant. When the amount of non-ionic surfactant is less than 0.03, the dispersibility of the flux drops, and the flux easily separates. On the other hand when the amount exceeds 5 weight parts, the dispersibility of the flux improves, but pyrolysis residues are produced from the non-ionic surfactant during brazing.

Ratio of flux/polymer compound

As stated hereabove, the amount of polymer compound is 0.5–25 weight parts relative to 5–30 weight parts of fluoride type flux. In other words, the weight ratio of flux/polymer compound is 0.2–60, a more preferable weight ratio being 0.5–20. When the weight ratio is less than 0.2, sufficient adhesion properties are obtained, but the amount of polymer compound for maintaining the flux is too high and pyrolysis residues are produced during brazing. On the other hand when the aforesaid weight ratio exceeds 60, the amount of polymer compound required to maintain the flux decreases, and adhesion properties decline.

Ratio of flux/non-ionic surfactant

The weight ratio of flux/non-ionic surfactant is 1–1000, but more preferably 5–500. When this weight ratio is less than 1, the dispersibility of the flux improves, but pyrolysis residues are produced from the non-ionic surfactant during brazing. Specifically, this is due to the fact that the polymer compound decomposes at a temperature of 140–200° C., whereas the surfactant decomposes at 200–250° C. On the other hand when the aforesaid weight ratio exceeds 1000, the dispersibility of the flux falls, and the flux easily separates.

Viscosity of flux composition

It is desirable that the viscosity of the flux composition of this invention is 150 cps to 500 cps at room temperature (23 degrees). When it is less than 150 cps, the adhesion amount of flux drops, and brazing defects are produced. When the viscosity exceeds 500 cps, more flux adheres than necessary, so a white residue of flux is produced when brazing is carried out.

Brazing Method

According to this invention, brazing of aluminum materials is performed using the aforesaid flux composition by the following steps.

First, the aforesaid flux composition is applied to the parts of the aluminum materials to be joined. The flux may be coated onto the parts by spraying or immersion, there being no particular limitation on the method of application. The coating amount is preferably of the order of 1–3 $g/m^2$ in terms of fluoride type flux amount. For example, a suitable amount (approximately 2 $g/m^2$ expressed as aluminum potassium fluoride flux) is coated onto parts of aluminum cladded plates (e.g. an aluminum alloy of JIS3003 core material clad on both sides by JIS4343 material with a cladding ratio of 10%) which are to be joined.

Next, the coating surface is heated to vaporize only the water in the flux composition. The fluidity of the composition is then lost, and the flux adheres to the joins due to the adhesive force of the polymer compound. In this heating step, it is necessary to remove the water without removing the polymer compound. Hence the temperature must be less than 150° C. to avoid decomposing the polymer compound, and 100–130° C. is particularly to be preferred. The heating time is preferably of the order of 1–10 minutes.

Next, work is performed which involves subjecting the aluminum material to friction or vibration. The work is, for example, transporting the material from the flux coating shop to the assembly shop, assembling, and transporting from the assembly shop to the polymer pyrolyzing step. As the flux adheres strongly to the joins due to the action of the polymer compound, there is no risk that it will come off even if the materials are subjected to friction or vibration.

Next, the flux composition coating surfaces are heated to pyrolyze the polymer compound, which is thereby removed from the joins so that only the flux remains in the joins. The assembly is then sent to the brazing step. If any polymer compound remains in the joins, pyrolysis residues will contaminate the fillet due to the high temperature of the subsequent brazing step, and there is a risk that the strength of the joints may decrease. In this polymer heating step, therefore, it is desirable that the polymer compound is pyrolysed while the brazing materials are not melted, and it is thus preferable to continue heating at 150° C. or higher for at least 5 minutes. In particular, 150–200 degrees or less is desirable. When heating is continued at this temperature for five minutes or more, at least 90% of the polymer compound is decomposed, and only flux remains adhering to the joins. In this state the adhesive force due to the polymer compound has already been lost, so care is taken not to subject the coated surfaces to friction or vibration at this stage.

The clad plates to which the flux composition is adhering are then assembled into the desired structure, and brazing is performed by heating the assembled structure in a nitrogen atmosphere at 600° C. for several minutes. Due to the action of the flux, good brazing quality is achieved.

PREFERRED FORMS OF THE INVENTION

Next, some specific examples and comparative examples will be given to better describe the invention.

EXAMPLES 1–5 AND COMPARATIVE EXAMPLES 1–4

(1) Preparation of flux compositions

Flux compositions were prepared for use in the examples and comparative examples according to the specifications shown in Table 1.

TABLE 1

|  |  | Example | | | | | Comparative Example | | | |
|---|---|---|---|---|---|---|---|---|---|---|
|  |  | 1 | 2 | 3 | 4 | 5 | 1 | 2 | 3 | 4 |
| Vehicle | Polyalkylene oxide polymer #1 | 2 | — | 3 | — | — | 4 | 30 | — | — |
| composition | Polyalkylene oxide polymer #2 | — | 10 | — | 0.5 | 20 | — | — | 0.1 | — |
| (wt %) | Polyalkylene oxide polymer #3 | — | — | — | — | — | — | — | — | 5 |
|  | Non-ionic surfactant #4 | 1 | 3 | 2 | 2 | 1 | 1 | 1 | 3 | 2 |
|  | Water | 77 | 67 | 90 | 67.5 | 69 | — | 44 | 86.9 | 73 |
|  | Dipropylene glycol | — | — | — | — | — | 75 | — | — | — |
|  | Fluoride type flux #5 | 20 | 20 | 5 | 30 | 10 | 20 | 25 | 10 | 20 |

Notes)
1: Polyethylene oxide polymer; Mol. Wt. 600,000
2: EO-PO block copolymer (EO: 85%, PO: 15%); Mol. Wt. 100,000
3: EO-PO random copolymer (EO: 50%; PO: 50%); Mol. Wt. 3,000
4: Polyoxyethylene alkylphenol ether
5: "knock-Lock" (Alkan K.K.)

(2) Evaluation tests

A suitable amount of flux (approximately 2 $g/m^2$ expressed as aluminum potassium fluoride flux) was coated onto join parts of an aluminum alloy of JIS3003 core material clad on both sides by JIS4343 material with a cladding ratio of 10%, and moisture was removed.

Next, the clad plates to which the flux composition was adhering were assembled into the desired structure, the polymer compound in the flux composition was pyrolysed, and brazing was performed by heating the assembled structure in a nitrogen atmosphere at 600° C. for several minutes.

(3) Evaluation method (a) Adhesion of flux

O Even if rubbed by hand, flux does not fall off

Δ If touched by hand, flux does not fall off, but it falls off if rubbed

X When touched by hand, the flux falls off (b) Brazing properties (fillet formation rate)

O Fillet formation rate 100%

Δ Fillet formation rate from 60% to 100%

X Fillet formation rate less than 60%

(c) Combustibility of vehicle (pyrolysis residue after brazing)

O Pyrolysis residue is not produced

X Pyrolysis residue is produced (d) Ease of coating

O A predetermined amount can be coated to a predetermined brazing part

Δ Coating drips and spreads from predetermined brazing part

X Coating cannot be applied as desired (e) Odor during application

O Odor is no particular problem

X Unpleasant odor (f) Dispersibility of flux (separation of flux after leaving all day at room temperature)

O Flux does not separate

X Flux separates

The examples and comparative examples were evaluated by the above methods. The results are shown in Table 2.

In the adhesion examination, the flux compositions were sprayed onto a flat test piece of JIS3003 material in a proportion of 2.5 g/m$^2$, the surface was dried at 120° C. for 5 minutes, and the coated surface was wiped with a cloth.

The flux composition was considered to be satisfactory if no more than 10% peeled off. The test results are also shown in Table 3.

Brazing tests were also performed using these flux compositions.

Figure 2:
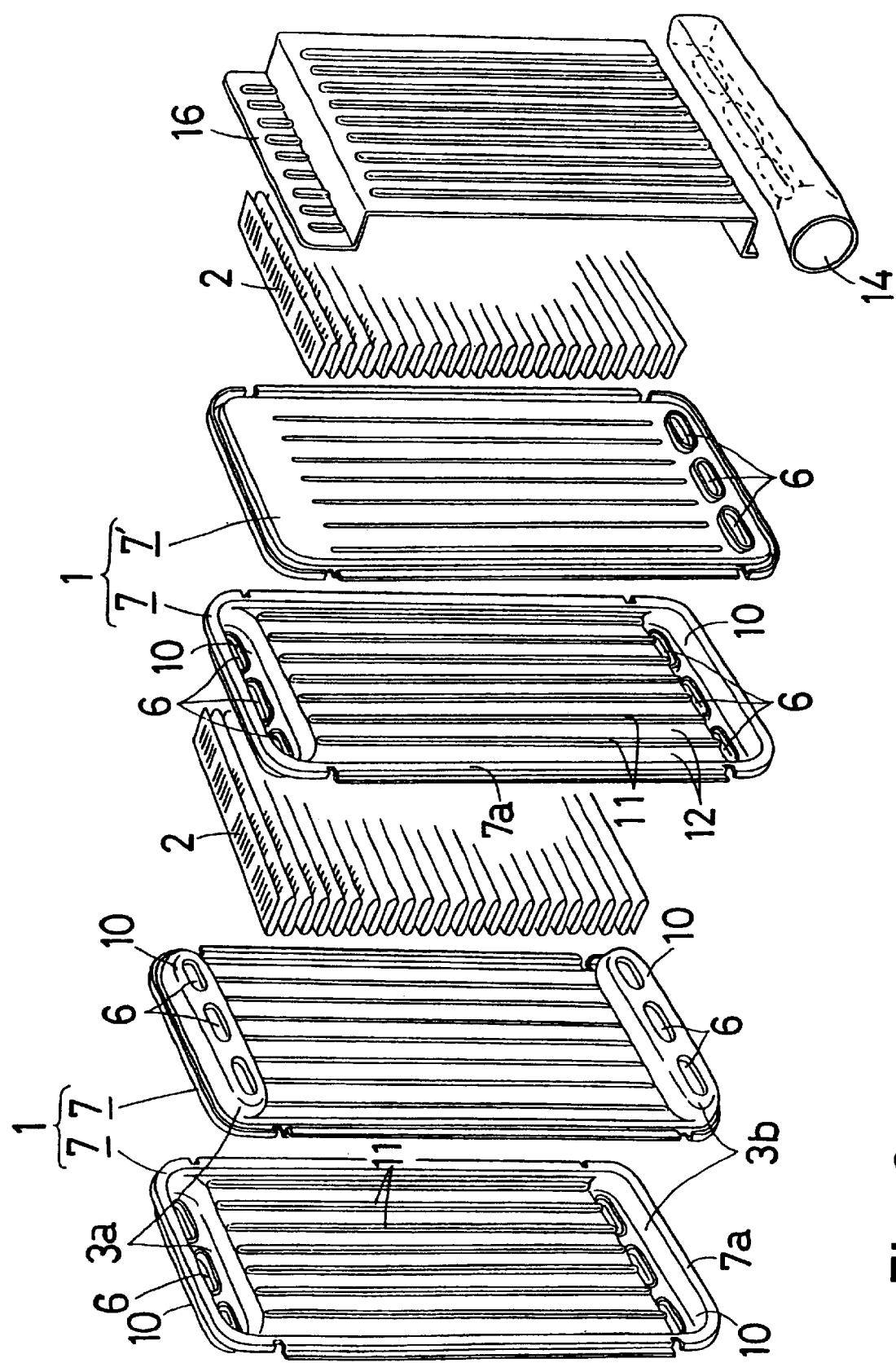
FIG. 2 is a perspective view showing part of the heat exchanger of FIG. 1.

The brazing tests were performed during production of the heat exchanger A shown in FIG. 1 and FIG. 2.

In the full view of the heat exchanger A shown in FIG. 1, a plurality of tubular elements 1 are arranged vertically to the left and right, colgate fins 2 being arranged between adjacent tubular fins 1 and at the outer ends of the tubular elements so that the whole forms a one-piece construction when brazing is performed.

The tubular elements 1 have expanded tank parts 3a, 3b at both ends in the length direction, and plates 5 forming flat

TABLE 2

|  |  | Example |  |  |  |  | Comparative Example |  |  |  |
|---|---|---|---|---|---|---|---|---|---|---|
|  |  | 1 | 2 | 3 | 4 | 5 | 1 | 2 | 3 | 4 |
| Evalution Method | Flux adhesion properties | O | O | O | O | O | O | O | Δ | X |
|  | Brazing properties | O | O | O | O | O | X | O | X | Δ |
|  | Vehicle combustibility | O | O | O | O | Δ | O | X | O | X |
|  | Ease of coating | O | O | O | Δ | O | O | X | X | X |
|  | Odor during operations | O | O | O | O | O | X | O | O | O |
|  | Flux dispersibility | O | O | O | O | O | O | X | O | O |

From these results, it was found that according to the flux compositions of these examples, adhesion of flux improved on the parts to be brazed, and brazing could be performed without leaving pyrolysis residues.

EXAMPLES 6–8 AND COMPARATIVE EXAMPLES 5–8

Next, specific examples of the method of brazing aluminum materials according to this invention will be described.

Flux compositions were prepared by blending materials in the proportions shown in Table 3.

coolant passages 4 in the length direction connecting the two tank parts 3a, 3b. Adjacent tubular elements 1 are joined with the tank parts 3a, 3b in contact, adjacent tank parts then being interconnected via coolant holes 6, 6 provided in the tank parts 3a, 3b. The aforesaid colgate fins 2 are formed of JIS3203 material sheets having a thickness of 0.12 mm in a predetermined shape.

The tubular elements 1 are formed by superposing two dish-shaped core plates 7 on their peripheral contact surfaces, and brazing them in a one-piece construction. This core plate 7 is a brazing sheet formed in a predetermined shape from a JIS3003 material core sheet of thickness 0.4

TABLE 3

|  |  | Composition |  |  |  |  |  |  |
|---|---|---|---|---|---|---|---|---|
|  |  | A (this invention) | B (this invention) | C (this invention) | D (this invention) | E (this invention) | F (Comparative example) | G (Comparative example) |
| Vehicle composition (wt %) | Polyalkylene oxide polymer #1 | 10 | 5 | 20 | 3 | 3 | 5 | — |
|  | Non-ionic surfactant #2 | 2 | 3 | 3 | 4 | 5 | 3 | 3 |
|  | Water | 78 | 77 | 62 | 73 | 67 | — | 82 |
|  | Dipropylene glycol | — | — | — | — | — | 77 | — |
|  | Fluoride type flux #3 | 10 | 15 | 15 | 20 | 25 | 15 | 15 |
|  | Flux adhesion properties | OK | OK | OK | OK | OK | OK | Failed |
|  | Unpleasant odor on heating | NO | NO | NO | NO | NO | YES | NO |

Notes)
1: Polyethylene oxide polymer; Mol. Wt. 600,000
2: Polyoxyethylene alkylphenol ether
3: "knock-Lock" (Alkan K.K.)

The adhesion of these flux compositions to aluminum materials, and the presence or absence of an unpleasant odor during heating, were examined.

mm clad on both sides with a JIS4343 material cover with a cladding ratio of 12%.

As shown in FIG. 2, excepting for an outer core plate 7' forming the outermost tubular element 1, caps 10 which extend outwards are formed at both ends of the core plates 7, the end walls of these caps 10 being pierced by three of the coolant holes 6, 6. Both ends of the outer core plate 7' of the outermost tubular element 1 are flat, the lower end being pierced by three of the coolant holes 6.

The tank parts 3a, 3b are formed by superposing the cap parts 10 of two opposite core plates 7, 7 or 7, 7'. The tank parts 3a, 3a or 3b, 3b of adjacent tubular elements 1 are then connected via the coolant holes 6.

Ribs 11 are formed running from one cap 10 to the other cap 10 on the inner surfaces of the core plates 7 and at a predetermined interval in the width direction of the core plates 7. By superposing two of these core plates 7, 7 comprising these ribs 11, peripheral join surfaces 7a are brought in contact, and the ribs 11, 11 on the two plates 7, 7 form an alternating arrangement. The tip of each rib 11 comes in contact with a flat part 12 between the ribs 11 on the opposite core plate 7. Plural coolant passages are thereby formed extending straight from the lower tank part 3b to the upper tank part 3a inside the coolant passages 4 of the tubular elements 1.

Plural tubular elements 1 are therefore brought in contact with the tank parts 3a, 3b of adjacent elements in contact, and enclosing the core plates 2 between them as shown in FIG. 1.

Herein, the inner layers of the core plates 7 are joined together whereas the tubular element 1 is joined to the colgate fin 2 via the outer layer of the core plate 7. Adjacent tubular elements 1 are joined together via their outer layers of the core plates 7.

In FIG. 1 and FIG. 2, a coolant inlet tube 14 and coolant outlet tube 15 are connected to each other via the aforesaid coolant holes 6 in the lower tank parts 3b on the outermost tubular elements 1. Side plates 16 are arranged outside the outermost colgate fin 2. These side plates 16 are also formed of the same brazing sheet, and are brazed to the outermost colgate fins 2.

Hence, in this brazing test piece, on the facing contact parts of a pair of core plates, two pieces of JIS3003 material are joined together with JIS4343 brazing material, and at the contact parts of the outer surface of a tubular element and a colgate fin, JIS3003 and A3203 material are joined together by JIS4343 brazing material.

These parts were brazed using one of the flux compositions in Table 3 and a combination of the following two steps.

The types of flux composition and combinations of steps, described hereafter, are shown in Table 4.

TABLE 4

|  | Example | | | Comparative Example | | | |
| --- | --- | --- | --- | --- | --- | --- | --- |
|  | 6 | 7 | 8 | 5 | 6 | 7 | 8 |
| Flux composition | A | B | D | F | G | A | B |
| Step | I | I | I | I | I | II | II |
| Brazing properties | Good | Good | Good | NG | NG | NG | NG |
| Amount of residue | Trace | Trace | Trace | Trace | Trace | Large | Large |

Note) Underlines in the table signify outside the range of this invention.

Step I (Method of this Invention)

i) A predetermined amount of flux composition was spray coated on the core plates 7, 7' and side plate 16.

(ii) The core plates 7,7' and side plates 16 were heated at 100 degrees for 5 minutes to remove the water in the flux composition.

(iii) The core plates 7,7' and side plate 16s were transported, and the heat exchanger was assembled with the colgate fins 2, coolant inlet pipe 14 and coolant outlet pipe 15.

(iv) The assembled heat exchanger was heated to 150° C. for 5 minutes to thermally decompose the polymer compound in the flux composition.

(v) The brazing was melted by heating at 600° C. for 5 minutes, and the component parts thereby joined.

Step II (Method of Comparative Examples)

(i) A predetermined amount of flux composition was spray coated on the core plates 7,7' and side plates 16.

(ii) The core plates 7, 7' and side plates 16 were heated to 150° C. for 5 minutes to remove water and thermally decompose the polymer compound in the flux composition.

(iii) The core plates 7,7' and side plates 16 were transported, and the heat exchanger was assembled with the colgate fins 2, coolant inlet pipe 14 and coolant outlet pipe 15.

(iv) The brazing was melted by heating at 600° C. for 5 minutes, and the component parts were thereby joined.

After brazing, the brazing properties were evaluated from the appearance of the fillet, and from visual observation of the amount of flux residue that had peeled off inside the heat exchanger. The test results are shown in Table 4.

From the results of Table 3 and Table 4, it was found that the according to this method of this invention, the flux composition has good adhesion properties. After coating, only water is removed leaving the flux to adhere strongly so that transport, fitting and other operations which might otherwise cause peeling of flux can be performed. As the resin binder is then thermally decomposed, exactly the right amount of flux is supplied when the brazing is melted on joins. Further, by adopting these steps, peeled flux residues inside brazing parts were avoided.

Industrial Field of Application

As described hereabove, the brazing method for aluminum materials according to this invention uses a flux composition comprising 5–30 weight parts of a fluoride type flux, 0.5–25 weight parts of a polymer compound having alkylene oxide repeating units of number average molecular weight 50,000–5,000,000 and water as the remainder, so the flux adheres strongly to aluminum materials due to its viscosity.

As the dispersant is water, the flux does not emit an unpleasant odor even when heated, work can be performed in a good environment, and operations with the flux are safe for humans.

After the flux composition is coated onto the aluminum materials to be joined, the coating surfaces are heated to remove water, the coated surfaces are again heated to pyrolyze the polymer compound, and brazing is then performed. Even if the aluminum materials are subjected to operations involving friction or vibration after heating to remove water but prior to heating to pyrolyze the polymer compound, flux does not fall off during the operations and the amount of flux left on joins when the brazing is melted is exactly the right amount, so a good brazing quality is achieved.

Flux residues do not remain inside and outside brazing products, hence coating defects, decrease of corrosion resistance and emission of unpleasant odor which such residues would cause are suppressed. In particular, regarding the brazing of heat exchangers, the problem of increased flow-path resistance due to flux residues is eliminated.

In the aforesaid brazing method, heating to remove water is performed at a lower temperature than 150° C., so only water is removed, the polymer compound remains, and the high adhesive force of the latter can be efficiently exploited.

By then heating at a temperature of 150 or higher or preferably 150–200° C. for 5 minutes or more to remove the polymer compound, the polymer compound is completely thermally decomposed.

As the brazing is melted after having removed the polymer from joins, a good brazing quality is achieved.

What is claimed is:

1. A flux composition for the brazing of aluminum materials characterized in comprising 0.5–25 weight parts of a polymer compound having alkylene oxide repeating units of number average molecular weight 50,000–5,000,000, 5–30 weight parts of a fluoride type flux and water added to make the composition up to 100 weight parts.

2. A flux composition for the brazing of aluminum materials as defined in claim 1 further comprising 0.03–5 weight parts of a non-ionic surfactant.

3. A flux composition for the brazing of aluminum materials as defined in claim 2 wherein a weight ratio of flux/non-ionic surfactant is 1–1000.

4. A flux composition for the brazing of aluminum materials as defined in claim 2 wherein a weight ratio of flux/non-ionic surfactant is 5–500.

5. A flux composition for the brazing of aluminum materials as defined in claim 1 wherein said polymer compound has repeating units of ethylene oxide and/or propylene oxide.

6. A flux composition for the brazing of aluminum materials as defined in claim 1 wherein said polymer compound is a polymer compound having a number average molecular weight of 500,000–1,000,000.

7. A flux composition for the brazing of aluminum materials as defined in claim 1 wherein an addition amount of said polymer compound lies in the range of 1–10 weight parts.

8. A flux composition for the brazing of aluminum materials as defined in claim 1 wherein an addition amount of a fluoride type flux lies in the range of 5–20 weight parts.

9. A flux composition for the brazing of aluminum materials as defined in claim 1 wherein said fluoride type flux is an aluminum potassium fluoride flux.

10. A flux composition for the brazing of aluminum materials as defined in any of claim 1, wherein said fluoride type flux is at least one of $AlF_3$-$KF$, $KAlF_4$-$K_3AlF_6$, $K_3AlF_6$, $KAlF_4$, $KF$-$AlF_3$-$Al_2O_3$ or $Cs_xAl_yF_z$.

11. A flux composition for the brazing of aluminum materials as defined in claim 1 wherein the weight ratio of flux/said polymer compound lies in the range 0.2–60.

12. A flux composition for the brazing of aluminum materials as defined in claim 1 wherein the weight ratio of flux/said polymer compound lies in the range 1–20.

13. A method for the brazing of aluminum materials wherein a flux composition comprising 0.5–25 weight parts of a polymer compound having alkylene oxide repeating units of number average molecular weight 50,000–5,000,000, 5–30 weight parts of a fluoride type flux and water added to make the composition up to 100 weight parts, is coated onto aluminum parts to be joined, the coated surfaces are heated to remove water, the coated surfaces are heated to pyrolyse the polymer compound, and heat is applied to perform brazing.

14. A method for the brazing of aluminum materials as defined in claim 13 wherein heating to remove water is performed at a temperature less than 150° C.

15. A method for the brazing of aluminum materials as defined in claim 13 wherein heating to remove water is performed at a temperature in the range 100–130° C. for 1–10 minutes.

16. A method for the brazing of aluminum materials as defined in claim 13 wherein heating to pyrolyse said polymer compound is performed at a temperature in the range 150° C. or higher for 5 minutes or more.

17. A method for the brazing of aluminum materials as defined in claim 13 wherein heating to pyrolyse said polymer compound is performed at a temperature in the range 150–200° C. for 5 minutes or more.

18. A method for the brazing of aluminum materials as defined in claim 13 wherein the coating amount of said flux composition is in the range 1–3 $g/m^2$ expressed as fluoride type flux.

19. A method for the brazing of aluminum materials as defined in claim 13 wherein an addition amount of said polymer compound lies in the range of 1–10 weight parts.

20. A method for the brazing of aluminum materials as defined in claim 13 wherein an addition amount of a fluoride type flux lies in the range of 5–20 weight parts.

* * * * *

UNITED STATES PATENT AND TRADEMARK OFFICE
CERTIFICATE OF CORRECTION

| | |
|---|---|
| PATENT NO. | : 6,059,174 |
| DATED | : May 9, 2000 |
| INVENTOR(S) | : Masahiro Kojima, Futoshi Watanabe, Atsuhiko Tounaka, Kiyotada Yasuhara, Hiroyuki Nojiri and Katsuyoshi Yamasoe |

It is certified that error appears in the above-identified patent and that said Letters Patent is hereby corrected as shown below:

Column 8,
Lines 13 and 36, change "colgate" to -- corrugated --.

Column 9,
Lines 29, 36, 38 and 43, change "colgate" to -- corrugated --.

Column 10,
Lines 3 and 18, change "colgate" to -- corrugated --.

Signed and Sealed this

Twenty-fourth Day of December, 2002

JAMES E. ROGAN
*Director of the United States Patent and Trademark Office*